Patented Jan. 7, 1936

2,026,813

UNITED STATES PATENT OFFICE 2,026,813

PROCESS FOR SALTING EDIBLE NUTS

James Eustace Bizzell, Brooklyn, N. Y., and Carey Kinchen Bizzell, Elizabeth, N. J.

No Drawing. Application October 19, 1933, Serial No. 694,338

8 Claims. (Cl. 99—11)

The objects of our invention are:

1. To prevent loss of salt from the nut kernel in handling or shipping.
2. To give an evenly salted product.
3. To salt with a very fine crystal so that the product will be smooth to the touch.
4. To salt in such a manner that the product will give a delightful blend of the natural qualities of the product with salt and prevent the sharp saline taste that is now experienced.
5. To salt in such a manner that the natural qualities of the product are not contaminated with the taste of easily spoiling preparations now generally used.

The objects outlined above are accomplished by applying a saline solution by any of the well-known methods, like spraying, dipping, brushing, or mopping, to the nut kernel and then evaporating the water from the kernel by any known method, thus leaving a very finely crystallized and evenly distributed salt layer that has penetrated and bonded to the surface of the kernel. The penetration and bonding of the even salt layer to the nut kernel gives a blend with the natural qualities of the nut that furnishes a smooth and delicate taste not otherwise acquired. Salt thus applied has a fine crystal, evenly distributed, that is smooth and dry to the touch and does not come off easily in handling or shipping.

Salt is applied to an edible nut for seasoning and how to blend the salt flavor with the natural qualities of the nut has been the object of much research. Experiments show that it is better to use an adhesive to bind the salt to the nut. A satisfactory adhesive must give no odor, flavor, nor color to the nut and must dissolve normally in the mouth. It must also not detract from the appearance of the nut. At the present time edible oil is the generally accepted binder for salt on edible nuts. This binder before very long furnishes an undesirable taste, such as rancidity. Under this method grease and considerable granulated salt come off the kernels when handled. Many other binders have been tried like gum arabic, albumen, gelatine, etc., without satisfactory results. Gum arabic leaves a bitter after taste. Albumen gives a very uneven and undesirable appearance and the albumen is adversely affected by heat and moisture. Gelatine is easily affected by heat and moisture and therefore becomes sticky and disagreeable to handle.

We have obtained a satisfactory saline solution by mixing water, salt and rice; or water, salt and rye; or water, salt, and any of the group under which rice and rye fall, that is cereal grains. We also get satisfactory results by mixing water, salt and pectin; or water, salt and dextrine. As an example, for a saline solution satisfactory results may be obtained by mixing one hundred parts water, thirty-two parts salt, and one-half part pectin. A satisfactory saline solution may be gotten by mixing one hundred parts water, thirty-two parts salt, and two parts rice, and then heat to the boiling point and filter. We do not confine ourselves to the proportions cited, as they are given only as examples.

As a further improvement in the saline solution, where dextrine or any of the group under which rice and rye fall, that is cereal grains, is used, we have added a small amount of gelatine, which has been found to combine with the other ingredients and form a stronger and more pliable coating.

The steps in our process consist of taking the edible nuts that have been prepared for salting and applying by any method above stated a saline solution prepared as hereinbefore set forth and then evaporating the water, thus leaving a relatively smooth salt layer that is dry.

We claim:

1. The process of salting the kernels of edible nuts which comprises preparing a treating medium by boiling rice in water, making the liquid saline, straining the same, applying the product so formed to the kernels and finally evaporating the water from the kernels.

2. The process of salting the kernels of edible nuts which comprises preparing a treating medium by boiling rice in a saline solution, straining the same, applying the strained liquid to the kernels, and finally evaporating the water from the kernels.

3. The process of salting the kernels of edible nuts which comprises preparing a treating medium by boiling a cereal grain in a saline solution, straining the same, applying the product so formed to the kernels and finally removing the water therefrom.

4. The process of salting the kernels of edible nuts which comprises preparing a treating medium by boiling a cereal grain in a saline solution, straining the same, adding gelatine, applying the product so formed to the kernels, and finally removing the water therefrom.

5. The process of salting the kernels of edible nuts which comprises preparing a treating medium by boiling a cereal grain in water, making the liquid saline, straining the same, applying the product so formed to the kernels and finally removing the water therefrom.

6. The process of salting the kernels of edible nuts which comprises preparing a treating medium by boiling a cereal grain in water, straining the same, adding common salt and gelatine thereto, applying the product so formed to the kernels and finally removing the water therefrom.

7. The process of salting kernels of edible nuts which comprises preparing a saline solution containing a colorless, odorless and tasteless dextrin, applying the solution to the kernels and finally removing the water therefrom.

8. The process of salting kernels of edible nuts which comprises preparing a saline solution containing a colorless, odorless and tasteless dextrin, adding gelatine thereto, then applying the product so formed to the kernels and finally evaporating the water therefrom.

JAMES EUSTACE BIZZELL.
CAREY KINCHEN BIZZELL.